June 22, 1965   R. M. RONNE   3,189,952
MULTIPLE MOLD CORE FORMING APPARATUS
Filed Sept. 4, 1962   2 Sheets-Sheet 2
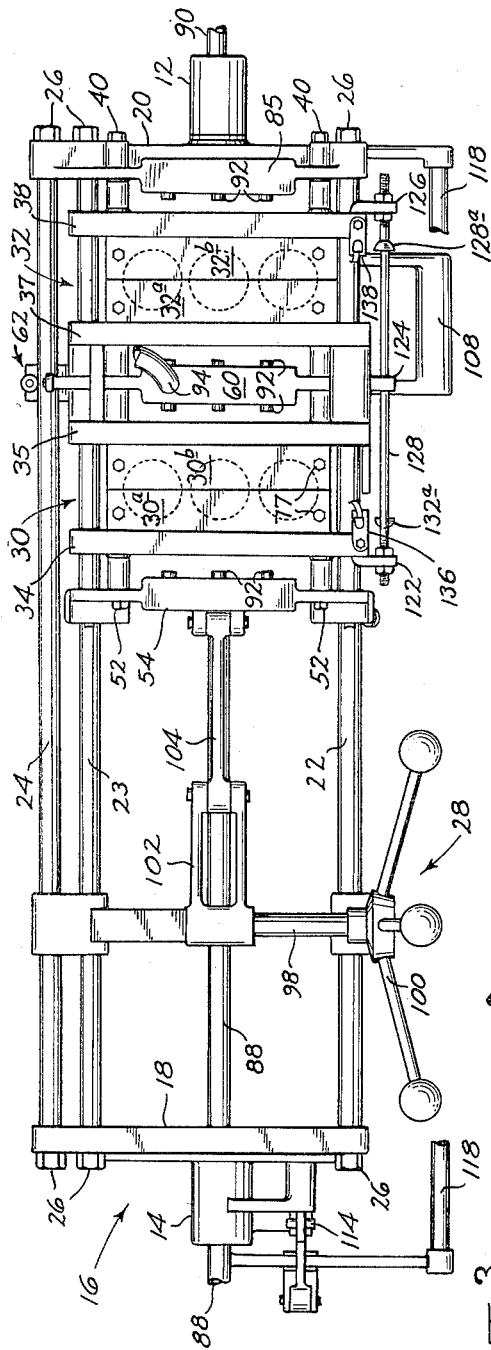
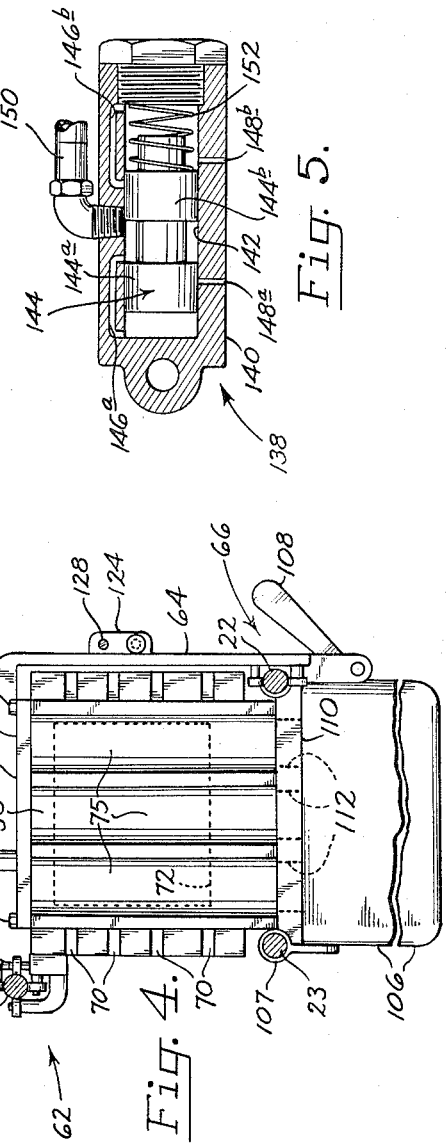
INVENTOR.
Ronald M. Ronne
BY
Ramsey, Kolisch & Hastwell
Attys.

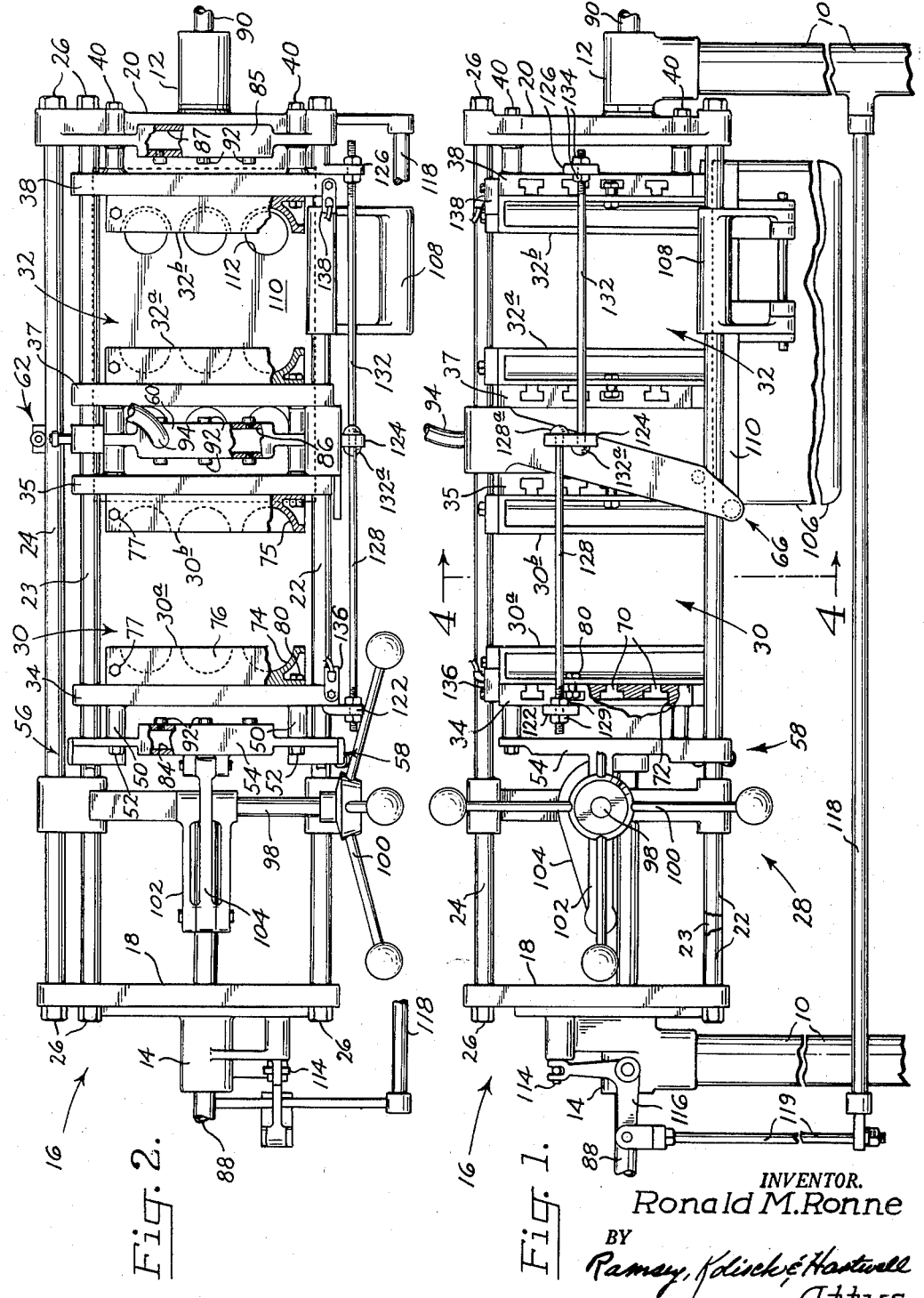

United States Patent Office 3,189,952
Patented June 22, 1965

3,189,952
MULTIPLE MOLD CORE FORMING APPARATUS
Ronald M. Ronne, Portland, Oreg., assignor to Dependable Shell Core Machines, Inc., Portland, Oreg., a corporation of Oregon
Filed Sept. 4, 1962, Ser. No. 221,124
7 Claims. (Cl. 22—10)

This invention relates to an apparatus for forming molded articles, and more particularly relates to apparatus for making cores from molding materials, such as resin-coated sand. A common use for such cores is in the manufacture of metal castings, where the cores have an exterior surface corresponding to the shape of the aperture desired in the casting.

A general object to this invention is to provide improved apparatus for forming molded articles, more specifically cores, which may be operated to produce a considerably larger output of cores than possible with conventional machines of similar complexity.

Another object is to provide such apparatus, characterized by greater flexibility in the type of cores that may be produced therewith than generally is found in other machines.

Yet another object is to provide improved apparatus for manufacturing cores, and other molded articles, which features an efficient use of thermal energy.

According to an embodiment of this invention, a plurality of separable core boxes, or patterns, provided with mold cavities therein, are supported on a rotatable mounting, with the core boxes disposed in a row along the mounting. The separable parts of the core boxes are mounted on a series of face or mounting plates, which may be shifted along the mounting. Ordinarily a pair of such mounting plates may be provided for each core box, with one plate supporting each half of the core box. Between the plates mounting adjacent core boxes a combustion chamber is provided into which a combustible fuel mixture may be discharged, when it is desired to apply heat. In conjunction with such plates, a novel operating means is provided, mounted on the mounting, which may be actuated to extend, or spread out, the various mounting plates and the core box halves mounted thereon, to permit the removal of finished cores therefrom. This same mechanism may also be actuated to shift the various box halves together, to place them in a position where their mold cavities may be filled or charged with molding material. The molding material is held in a container supported on the mounting adjacent one end of the assembly of core boxes, and upon rotating the mounting to invert the container, molding material flows into the cavities of the core boxes thus to fill them.

Another object of the invention, therefore, is to provide apparatus for manufacturing molded articles, more specifically cores, which comprises plural core boxes mounted on a mounting, said core boxes including separable halves, with such core box halves positioned and arranged on a row of mounting plates that may be shifted in a novel manner to spread the core box halves apart, when it is desired to remove finished cores.

A related object is to provide a machine for making molded articles, such as cores, which includes a loading station, and plural core boxes which may be shifted into this loading station, where all the boxes may be charged or filled with sand or molding material simultaneously.

In the making of cores from resin-coated sand, heat is applied to unify the sand mixture into a finished core. It has been discovered that a practical way of applying heat is by directing jets of combustible fuel against the external surfaces of the core boxes. According to this invention, between adjacent core boxes a pair of spaced-apart mounting plates facing in opposite directions are provided, and between these spaced-apart plates is a combustion chamber into which the combustible fuel mixture is discharged. Such fuel mixture, when ignited, uniformly heats the core box halves disposed on either side of the mounting plates, and there is a minimum amount of heat lost.

As a means for separating the core box halves from each other to facilitate core removal, this invention contemplates a single operating means that may be actuated to produce separation of all the core box halves in the row of core boxes. Novel mechanism is provided interconnecting the various mounting plates whereby this may be accomplished.

Another object of the invention is to provide means whereby the spacing between those mounting plates that hold opposite halves of a core box may be adjusted, to take care of different sizes and styles of patterns of core boxes.

Another object is to provide mechanism that through a novel vibratory action facilitates the removal of finished cores from the core boxes.

Other objects and advantages will become apparent, as the following description is read in conjunction with the accompanying drawings, wherein:

FIG. 1 is a front elevation of portions of apparatus embodying this invention;

FIG. 2 is a top plan view of the apparatus illustrated in FIG. 1, with portions broken away;

FIG. 3 is a view, similar to FIG. 2, but showing parts in the apparatus in a different position of adjustment;

FIG. 4 is a cross-sectional view, taken generally along the line 4—4 in FIG. 2; and FIG. 5 is an enlarged, cross-sectional view of vibration mechanism provided in the machine or apparatus.

Referring now to the drawings, the apparatus shown comprises a frame including spaced supports 10, suitably held in a vertical position in the frame. Extending between supports 10, and journaled in bearings 12 and 14 adjacent the top of the supports, is an elongated rotatable mounting or reel 16.

Mounting or reel 16 may take any of various forms of construction. In the embodiment illustrated, the mounting comprises end members 18, 20, which are joined by two longitudinally extending lower rods 22, 23, and an upper rod 24. Rods 22, 23, 24 are fixed in any suitable manner to the end members, as by nuts 26 illustrated. The rods and end members form a rigid mounting for the operating parts, to be described below.

As indicated above, this invention contemplates the provision of a plurality of core boxes, each comprising separable core box halves, which are supported on a mounting, and which are extended, or spread out from each other, by actuation of a novel operating means, to enable removal of finished cores. In the drawings, such operating means is indicated generally at 28, and a pair of such core boxes are illustrated at 30 and 32.

More specifically, and describing how the core boxes are supported on mounting 16, plural pairs of opposed mounting or facing plates are shown in the drawings, with the plates of one pair indicated at 34, 35, and the plates of the other pair indicated at 37, 38. These are disposed in a row, and the plates at the end of the row, i.e., plates 34, 38, face inwardly. Plates 35, 37 between end plates 34, 38, face away from each other.

Plate 38 is a nontraveling plate, and is mounted in a fixed position on the mounting by means of fasteners 40 securing the plate to member 20. The other plates are movable along the length of mounting 16, enabling them to be displaced toward and away from the fixed plate, between the position for the plates shown in FIG. 3, and the position shown in FIGS. 1 and 2.

Thus, considering plate 34, and with reference to FIG. 2, this plate is connected through posts 50 and fasteners 52, to an element 54 disposed to the left of the plate in FIG. 2. At the base of element 54, and traveling along rods 22, 23 (which constitute a guide means in the construction) are roller guide mechanisms 56, 58. Mechanisms 56, 58 guide element 54 and the mounting plate fastened thereto for movement along mounting 16.

Plates 35, 37, which are positioned between the end mounting plates, are fastened to an element or interconnecting means 60 intermediate the plates. Element 60, like element 54, is also guided for movement longitudinally of the mounting. The construction employed, in the embodiment illustrated, is somewhat different than the construction used for element 54, however, because of clearance difficulties. Mounted on one side of element 60 and movable over rod 24 is a roller mechanism 62 (see FIGS. 2 and 4), which guides one side of the element on mounting 16. Guiding the other side of the element is a depending arm 64 secured to the element having a roller mechanism 66 mounted at the base thereof which travels along rod 22.

As shown best in FIGS. 1 and 4, each of the face or mounting plates 34, 35, 37, 38 is provided with a series of laterally disposed T-shaped slots 70. These slots connect, through an opening 72 in the back of the plate, with the space behind each plate. The slots in a plate provide passageways enabling a combustible fuel mixture to pass through a plate when such is ejected thereagainst. The slots also provide a convenient means for mounting a core box half in proper position over the front of a plate.

Core boxes 30, 32, already discussed generally, are similar in construction and only one is described in detail. Describing core box 30, this comprises separable halves 30a, 30b. The two core box halves are provided with complementary molding surfaces, indicated for the two halves at 74, 75, that define mold cavities within the core box. When the two core box halves are together, the cavities defined by the molding surfaces have a shape corresponding to the contour desired in the core being manufactured. Over the top of the core box halves are covers 76 secured in place as by cap screws 77. (Core box 30 shown in the drawings is designed to produce substantially cylindrical cores, but it should be obvious that by modification of the molding surfaces other shapes may be made.)

A core box half may be fastened to the mounting or face plate in back of it, as by using screw and clip assemblies 80. The construction enables a core box half to be removed easily, when substitution of another core box, with a different shaped mold cavity, is desired.

In the manufacture of shell cores, the core box halves are heated for a predetermined amount of time, which plasticizes the resin in the molding mixture. In the embodiment of the invention illustrated, such heating is produced by directing a jet or jets of an ignited combustible fuel mixture, against the oppositely disposed halves of a core box. This gives direct heating of the halves, which has been found to be highly satisfactory.

Considering now the means for heating the core boxes, element 54 to the back of plate 34, and element 60 to the back of plates 35, 37, are each provided with an internal chamber, indicated at 84 and 86, respectively. To the back of plate 38, and mounted on member 20, is an element 85 having a similar internal chamber 87. A combustible fuel mixture, for instance air and gas, is fed into chamber 84 by means of a tube 88 passing through the center of bearing 14 and connecting with chamber 84. A similar mixture is fed into chamber 87 through a tube 90 connected to chamber 87 and passing through bearing 12. The fuel mixture is supplied chamber 86 through a flexible hose 94. Nozzles 92 communicating with the various chambers direct the fuel mixture supplied the chambers against the face plates described, with such fuel mixture passing through the slots provided in the face plates and against the core box halves mounted on the front sides of the plates.

Core box 32 comprises box halves 32a, 32b, similar to the halves of core box 30. In the apparatus described, box halves 30b and 32a are so joined together (through plates 35, 37 and element 60 that these are both joined to) and move as one along mounting 16, on movement of element 60. Thus, core box halves 30b, 32a may be thought of as constituting an intermediate molding device, mounted in the apparatus with complementary molding devices (core box halves 30a, 32b) on either side thereof and movable relative thereto. In this intermediate molding device, the space between plates 35, 37 where element 60 is mounted, constitutes a combustion cavity into which a combustible fuel mixture is ejected by nozzles 92 that connect with the chamber within element 60. As seen in FIG. 2, the space between plates 35, 37, that is, the combustion cavity, communicates with the atmosphere adjacent the top and bottom of the plates. This enables air to enter into the cavity and support the combustion of a fuel mixture ejected by nozzles 92, and also enables combustion products to leave the cavity.

With the core box halves moved together and to the right of the apparatus, as shown in FIG. 3, the core boxes are in the loading station of the apparatus and above a container or receptacle 106, which is provided for holding molding material such as a mixture of sand and resin. The container is mounted, by a pivot connection 107 (see FIG. 4) and a latch 108, with the top thereof adjacent the core boxes. The latch may be disconnected, to enable one side of the container to swing down, when it is desired to fill the container with a new charge of molding material. A piece of insulating material, such as wood, referred to as an investment board and indicated at 110, overlies the top of the container. Board 110 contains apertures 112 which register with the bottoms of the mold cavities in the core boxes. These apertures provide passages connecting the interior of the container with the mold cavities, and accommodating the transfer of material from the container to the cavities when the machine is operated.

When investing, or charging the mold cavities of the core boxes, mounting 16 is rotated on the frame with inverting of the core boxes and the container, so that material flows by gravity or under air pressure into the core boxes. Locking the mounting in place on the frame with the container upright is a latch pin 114 (see FIGS. 1 and 2), which may be shifted to the left to release the mounting for movement. The pin is shifted through a bell crank lever 116 journaled on a support 10, and operated by a treadle 118 connected through link 119 to the bell crank lever.

Describing now more in detail operating means 28 provided for shifting the core boxes, journaled on mounting 16 on one side of the core boxes, is a shaft 98 with a hand wheel 100 connected thereto. An arm 102 secured to shaft 98 is connected to element 54 through a link 104 pivotally attached to the arm and element, respectively. Wheel 100 may be rotated in a clockwise direction in FIG. 1, to shift element 54, and face plate 34 and the box half secured thereto, to the right in FIG. 1. Rotation of the arm in the opposite direction returns the various parts to their original position. When box half 30a secured to plate 34 is shifted to the right, and after a certain amount of movement, it first engages box half 30b, which results in shifting of box halves 30b, 30a to the right on continued movement of box half 30a. Movement stops when the box halves are together and adjacent the right end of the apparatus, as shown in FIG. 3.

Means is provided operatively interconnecting the various face plates, whereby on displacement of plate 34 to the left in FIGS. 1, 2, and 3, and away from plate 38 with box half 32b mounted thereon, plates 34 and 35 and plates 37 and 38 are spread apart from each other, with such accompanied with spreading apart of the box halves.

More specifically, secured to and projecting out from face plate 34 is an ear 122. Joined to arm 64, and thus an integral part of the intermediate molding device, and face plates 35, 37, in another ear 124. Projecting out from and joined to face plate 38, is an ear 126 similar to ear 122.

Extending between ears 122, 124 is an elongated bar or link 128. As shown in FIG. 1, the right end of link 128 includes a head 128a which engages ear 124 to prevent the link from being withdrawn from the ear. The left end of link 128 is secured to ear 122 by nuts 129. A similar bar or link 132 including a head 132a engaging ear 124 extends between ears 124, 126. This bar has its right end secured to ear 126 by means of nuts 134. The two links described accommodate movement of the box halves toward each other, but limit movement of the box halves away from each other, beyond the position indicated for them in FIGS. 1 and 2.

After the production of a series of cores in the box halves, the box halves may be shifted to the position shown in FIGS. 1 and 2, from their position in the loading station, by manipulation of operating means 28 described. On the withdrawal of plate 34 to the left, first only plate 34 is retracted positively until such time as head 128a strikes ear 124. On continued movement of plate 24 to the left, the intermediate molding device, comprising core halves 30b, 32a, and the plates they are mounted on, is shifted positively to the left, until link 132 prevents further separation of the intermediate molding device from box half 32b and plate 38. With the box halves fully extended from each other, they are spaced apart sufficiently to enable cores to be removed easily from the box halves.

To facilitate removal of finished cores, usually a mixture such as a silicone solution is spread over the surfaces defining the mold cavities, to inhibit the cores from sticking on these surfaces. This may be done prior to investing or charging the mold cavities with molding material. In each core box, preferably a greater amount of the material inhibiting sticking is spread over the molding surface of one core box half than the other. Thus, upon separation of the core box halves, finished cores will tend to remain seated, until loosened, in that core box half which has the smallest spread of such material over its mold surfaces.

Final loosening of the cores may be done by vibrating the core box half containing cores seated therein, so that a series of sharp impacts is made on the core box half, with such impacts directed toward the back of the core box half. Vibrator mechanisms that perform this function are indicated at 136, 138, and one of these is illustrated in detail in FIG. 5.

Referring to FIG. 5, each vibrator mechanism includes a hollow housing 140 closed at its ends. The interior 142 of the housing slidably accommodates a shiftable spool element 144. Element 144 has enlargements 144a, 144b used in regulating the flow of air through the two sets of inlet passages 146a, 146b and two sets of exhaust passages 148a, 148b. Air under pressure is admitted to the mechanism through supply conduit 150. A spring 152 urges element 144 to the position in FIG. 5, when the mechanism is at rest.

Explaining the operation of the vibrator mechanism, when air under pressure is first introduced through conduit 150, the air passes through inlets 146a to the left end of the spool element, which shifts the spool toward the right of the housing and compresses spring 152, which cushions it. On the spool element moving to the right of the housing, inlets 146a are closed, and inlets 146b are opened, by the enlargements. Further, exhaust passages 148a are opened and exhaust passages 148b are closed. Thus, with the spool element at the right end of the housing, air under pressure is introduced to the right end of element 144, causing the element to move from right to left, with the element thrown violently against the left of the housing and causing a jar in the mechanism.

Explaining how the apparatus as a whole may be operated, first all the core box halves are moved together, to the loading position shown in FIG. 3. They may then be heated, to some elevated temperature, after which treadle 118 is depressed, which shifts pin 114 to a position releasing mounting 16. The mounting may then be grasped by one of the bars, and rotated to invert the various core boxes and to place container 106 on top of the assembly. This enables molding material to flow, by gravity, into the various mold cavities. After a period of time, which is accompanied with heating of the resin in the molding material, the mounting is returned to its original position, and the sand which has not become integrated into a core, flows back into container 106. Hollow cores are formed, with the thickness of the walls of the cores dependent upon the length of time that heat is applied to the resin sand mixture with the core boxes inverted. With the cores formed, the core boxes may be spread apart, by actuating the operating means described, and the vibrator mechanisms then operated, with loosening of the final cores.

This invention has been described in connection with a pair of core boxes set side by side, although it should be obvious that more than a pair may be employed, with similar advantages obtained. Also, the specific shapes of the core boxes, and the cavities therein, are subject to variation, depending upon the articles desired to be produced. Further, details of the construction of the mounting, and other parts may be changed, depending upon the type of operation desired, and other practical considerations.

The advantages of the construction should be obvious. For one thing, by using plural core boxes, the production capacity of the machine is considerably enlarged. The core boxes are easily charged, or invested with molding material, by inverting them as a unit. Positive separation of all the core box halves is produced upon actuation of the single operating means described.

Nuts 129, 134 are adjustable on the threaded ends of links or bars 128, 132, to accommodate adjustment in the spacing produced between the core box halves when they are extended from each other. A feature of the invention is that the intermediate molding device may be adjusted to have any number of positions relative to the complementary molding devices on either side, with the devices in their spread apart position.

I claim:

1. In apparatus for forming molded articles, a mounting, a series of separable molding devices disposed in a row and mounted side by side on said mounting, said series including a nontraveling molding device and plural movable devices positioned to one side thereof, means including complementary molding surfaces defining mold cavities between adjacent pairs of the movable devices and between the nontraveling device and the movable molding device nearest to it, and operating means for displacing said movable devices by shifting them in one direction away from said nontraveling device, said operating means including a positive connection with each of said movable devices operable on actuation of the operating means to produce a spacing between adjacent movable devices and between the movable devices and said nontraveling device.

2. In apparatus for forming molded articles, a mounting including a guide, a series of separable molding devices disposed in a row and mounted in position closely adjacent each other on said mounting, said series including a nontraveling device and plural movable devices, all of which are positioned laterally of one of the sides of said nontraveling device and mounted on said guide for movement therealong, means defining mold cavities between adjacent pairs of said devices including complementary molding surfaces presented by the pair of devices, and operating means for displacing said movable devices, said operating means including an actuator mounted on said mounting, means connecting said actuator and the one of said movable molding devices farthest from said nontraveling device whereby when the actuator is actuated said farthest device is shifted positively away from said nontraveling device, lost motion means connecting said farthest device with the remaining molding devices intermediate it and said nontraveling device whereby on a predetermined amount of movement said remaining devices are positively shifted, and means interconnecting said remaining devices and said nontraveling device limiting relative movement therebetween.

3. The apparatus of claim 2, wherein said means connecting said farthest device with said remaining devices includes adjustment means for adjusting the movement required in said farthest device to produce shifting of said intermediate device.

4. In apparatus for forming cores, a frame, a mounting rotatably supported on said frame including elongated guide means, a first core box comprising two mated separable core box halves mounted on said mounting with one of said halves mounted in a stationary position thereon and the other of said halves movably supported by said guide means for movement away from said stationary half, a second core box also comprising two mated separable halves movably mounted on said mounting adjacent said first core box with one half thereof movably supported by said guide means next to the movable half of said first core box and the other half thereof movably supported by said guide means at a point beyond its said one half from said stationary half of the first core box, a single operating means operative to displace said movable core box halves a predetermined distance away from said stationary half of the first core box to a position in which all the core box halves are separated and to move the core box halves to a second position in which the corresponding halves are mated, each of said core boxes having molding surfaces defining molding cavities therein, and means mounted on said mounting for introducing molding material into said cavities when said core box halves are together.

5. The apparatus of claim 4, wherein said operating means comprises an actuator mounted on said mounting, means connecting said actuator to said other half of said second core box operable to produce shifting of said other half in a direction away from said stationary core box half, lost motion means connecting the said other half of said second core box with its said one half, and means limiting movement of the said other half of said first core box from its said stationary half.

6. In apparatus for forming cores, plural pairs of opposed mounting plates disposed in a row and adapted to receive separable core box halves thereinbetween, a mounting including elongated guide means, means securing the plate at one end of said row in a stationary position on said mounting, means mounting the remainder of said plates on said guide means whereby they are movable therealong, means positively interconnecting the plates whereby when the plate at the other end of said row is shifted away from said fixed plate the remaining movable plates are also shifted in the same direction, said means including means interconnecting successive pairs of plates accommodating separation of the plates in successive pairs of plates and defining a predetermined spacing between these plates upon their separation from each other, and operating means mounted on said mounting and connected to said plate at the other end of said row operable when actuated to shift the plate from said fixed plate.

7. In apparatus for forming cores, plural pairs of opposed mounting plates disposed in a row and adapted to receive separable core box halves thereinbetween, interconnecting means securing together in fixed relative position the adjacent plates of two adjacent pairs of plates, means defining a combustion cavity between the adjacent plates of two adjacent pairs of plates secured in fixed relative position by said interconnecting means, means for directing a combustible mixture into said combustion cavity, a mounting including elongated guide means, means mounting the plates on said mounting with the plates of each pair of plates spreadable from each other on said mounting, operating means mounted on said mounting and connected to the plate at one end of said row of plates for drawing the plate away from the plate at the opposite end of said row, and means interconnecting the plates between the plates at opposite ends of said row with the plate at said one end of said row of plates whereby movement of the latter away from the plate at said opposite ends of the row produces similar movement of the plates between the two end plates and spreading apart of the plates in a pair of plates.

References Cited by the Examiner
UNITED STATES PATENTS

| | | | |
|---|---|---|---|
| 1,162,246 | 11/15 | Menough | 22—149 |
| 1,922,937 | 8/33 | Eckert | 18—30 |
| 2,223,385 | 12/40 | Plessman | 22—149 |
| 2,929,119 | 3/60 | Ronne | 22—10 |

MARCUS U. LYONS, *Primary Examiner.*

MICHAEL V. BRINDISI, *Examiner.*